(12) United States Patent
Ravise et al.

(10) Patent No.: US 11,931,996 B2
(45) Date of Patent: Mar. 19, 2024

(54) METHOD FOR MANUFACTURING A SOUNDPROOFING ASSEMBLY HAVING TWO SUPERPOSED PANELS

(71) Applicant: Airbus Operations SAS, Toulouse (FR)

(72) Inventors: Florian Ravise, Toulouse (FR); Benoit Cadiou, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 149 days.

(21) Appl. No.: 17/495,885

(22) Filed: Oct. 7, 2021

(65) Prior Publication Data

US 2022/0111627 A1 Apr. 14, 2022

(30) Foreign Application Priority Data

Oct. 9, 2020 (FR) ...................................... 2010334

(51) Int. Cl.
| | | |
|---|---|---|
| *B32B 38/04* | (2006.01) | |
| *B32B 3/12* | (2006.01) | |
| *B32B 3/26* | (2006.01) | |
| *B32B 7/12* | (2006.01) | |
| *B64D 29/00* | (2006.01) | |

(Continued)

(52) U.S. Cl.
CPC ............... *B32B 38/04* (2013.01); *B32B 3/12* (2013.01); *B32B 3/266* (2013.01); *B32B 7/12* (2013.01); *B64D 29/00* (2013.01); *G06T 7/0004* (2013.01); *G06T 7/13* (2017.01); *G10K 11/168* (2013.01);

(Continued)

(58) Field of Classification Search
CPC ............. B32B 3/12; B32B 3/266; B32B 7/12; B32B 2307/102; B32B 38/04; B32B 2038/047; G06T 7/0004; G06T 7/13; G06T 2207/30108; B64D 29/00; G10K 11/168

See application file for complete search history.

(56) References Cited

U.S. PATENT DOCUMENTS

| | | | |
|---|---|---|---|
| 4,265,955 A | 5/1981 | Harp et al. | |
| 4,816,097 A * | 3/1989 | Williams ............... | B23K 26/18 |
| | | | 428/116 |

(Continued)

FOREIGN PATENT DOCUMENTS

| | | | | |
|---|---|---|---|---|
| EP | 2542401 B1 * | 5/2017 | ............. | B23B 39/16 |
| FR | 2962586 A1 * | 1/2012 | ............. | G10K 11/172 |

OTHER PUBLICATIONS

English translation of FR-2962586-A1, accessed May 2, 2023 via USPTO Search Tool (Year: 2012).*
French Search Report; priority document.

*Primary Examiner* — Jeremy A Luks
(74) *Attorney, Agent, or Firm* — Greer, Burns & Crain, Ltd.

(57) ABSTRACT

A method for manufacturing a soundproofing assembly involving providing a first panel of honeycomb structure, fastening an intermediate plate against a second face of the first panel, adhesive-coating a layer of adhesive on the intermediate plate, providing a second panel of honeycomb structure, bonding the first face of the second panel to the layer of adhesive, and perforating the intermediate plate and the layer of adhesive through the cells of the first panel or the cells of the second panel at the bonding zone of the second panel. Such a method makes it possible to save time by dispensing with additional preparation steps.

7 Claims, 2 Drawing Sheets

(51) Int. Cl.
*G06T 7/00* (2017.01)
*G06T 7/13* (2017.01)
*G10K 11/168* (2006.01)

(52) U.S. Cl.
CPC ............... *B32B 2038/047* (2013.01); *B32B 2307/102* (2013.01); *G06T 2207/30108* (2013.01)

(56) References Cited

U.S. PATENT DOCUMENTS

| | | | |
|---|---|---|---|
| 5,041,323 A | | 8/1991 | Rose et al. |
| 5,912,442 A | * | 6/1999 | Nye ................. B64G 1/22 |
| | | | 181/292 |
| 6,203,656 B1 | | 3/2001 | Syed |
| 2004/0163888 A1 | | 8/2004 | Johnson |
| 2005/0147790 A1 | | 7/2005 | Levavasseur |
| 2006/0219477 A1 | * | 10/2006 | Ayle ................. G10K 11/172 |
| | | | 181/288 |
| 2014/0202789 A1 | | 7/2014 | Heurtaux et al. |
| 2016/0201317 A1 | | 7/2016 | Liou et al. |

* cited by examiner

METHOD FOR MANUFACTURING A SOUNDPROOFING ASSEMBLY HAVING TWO SUPERPOSED PANELS

CROSS-REFERENCES TO RELATED APPLICATIONS

This application claims the benefit of the French patent application No. 2010334 filed on Oct. 9, 2020, the entire disclosures of which are incorporated herein by way of reference.

FIELD OF THE INVENTION

The present invention relates to a method for manufacturing a soundproofing assembly having two superposed panels, in particular for an aircraft propulsion assembly, a soundproofing assembly obtained with the aid of such a method, a propulsion assembly using such a soundproofing assembly, and an aircraft having at least one such propulsion assembly.

BACKGROUND OF THE INVENTION

During operation, an aircraft engine generates noise. This engine is housed in a nacelle and, in order to attenuate this noise, it is known to put in place soundproofing assemblies that make it possible to absorb the noise and are disposed around the engine in the structure of the nacelle.

Such a soundproofing assembly takes, for example, the form of two radially superposed panels, wherein each panel has a honeycomb structure. Between the two panels is arranged an interposed membrane that is pierced so as to allow the propagation of sound waves between the two panels.

Such an assembly has a first plate, called resistive plate, which is pierced with holes and is intended to be oriented towards the source of the noise. The holes allow the passage of sound waves.

The assembly has, fastened to the first plate, a first panel and the intermediate plate fastened to the first panel on the side opposite the first plate.

The assembly has, fastened to the intermediate plate on the side opposite the first panel, a second panel.

The assembly then has a second plate that is fastened to the second panel on the side opposite the intermediate plate.

A method for producing such an assembly consists in pressing the intermediate plate against the first panel and, after crosslinking under the effect of heat, in piercing the second plate at the surface of the intermediate plate against which the second panel abuts.

The method then consists in pressing the second plate against the second panel followed by crosslinking under the effect of heat.

The second panel is then put in place against the first plate, and then the second panel is put in place against the intermediate plate.

Although such a method is currently well controlled, it entails additional intermediate steps that are time consuming. For example, after the piercing of the intermediate plate, it is necessary to clean the intermediate plate of burrs and dust due to the piercing.

A second method for producing such an assembly consists in piercing the intermediate plate before pressing it against the first panel. Such a method entails the application of a delamination fabric to the intermediate plate before piercing. This fabric then has to be removed before being pressed against the first panel. Such a method thus involves at least one surface preparation step.

Furthermore, during the implementation of the first or second method, since the piercing is effected before the second panel is put in place, certain holes in the intermediate plate can be obstructed by the second panel, hence it is necessary to make a greater number of holes in order to ensure the effectiveness of the soundproofing assembly.

It is therefore necessary to find a method that makes it possible to save time when producing such a soundproofing assembly.

SUMMARY OF THE INVENTION

An aim of the present invention is to propose a method for manufacturing a soundproofing assembly that has two superposed panels and which is less time consuming.

To this end, a method for manufacturing a soundproofing assembly is proposed, the manufacturing method involving:
- a first provision step during which a first panel of honeycomb structure is provided, each cell of the first panel opening both at a first face of the first panel and at a second face of the first panel, wherein the cells are joined along nodal joints,
- a fastening step during which an intermediate plate is fastened against the second face of the first panel so as to close off one end of each cell of the first panel,
- an adhesive-coating step during which a layer of adhesive is deposited on the intermediate plate on the side opposite the first panel,
- a second provision step during which a second panel of honeycomb structure is provided, each cell of the second panel opening both at a first face of the second panel and at a second face of the second panel, wherein the cells are joined along nodal joints,
- a bonding step during which the first face of the second panel is bonded to the layer of adhesive, and
- a perforation step during which the intermediate plate and the layer of adhesive are perforated through the cells of the first panel or the cells of the second panel at the bonding zone of the second panel, wherein an imaging unit captures an image of an opening of a cell and transmits this image to a control unit that analyses it and identifies edges of the cell, wherein the control unit determines positions for the piercings inside these edges and controls a piercing unit so that it is positioned successively facing each of the determined positions for the piercings and effects the piercings.

Such a method makes it possible to save time by dispensing with additional preparation steps and makes it possible to ensure a degree of acoustic perforation that is equal to the degree of geometric perforation. In addition, such a method makes it possible to adapt the positioning of the second panel of honeycomb structure to the shape of the surface of the intermediate plate and of the first panel thus obtained, making it possible to improve the performance of the soundproofing assembly.

Advantageously, the imaging unit captures an image of a plurality of openings of neighboring cells and transmits this image to the control unit that analyses it and identifies two nodal joints of the cell and two nodal joints of the neighboring cells that have the same orientation as the nodal joints of the cell and are disposed on either side of the cell, wherein the control unit determines a central position of the cell and controls the piercing unit so that it is positioned facing the determined central position and effects a piercing.

Advantageously, the central position corresponds to a position that is equidistant from the two nodal joints of the cell and equidistant from the two nodal joints of the neighboring cells.

Advantageously, the manufacturing method involves, between the bonding step and the perforation step, a curing step.

Advantageously, the manufacturing method involves a placement step during which a first plate that is porous to sound waves is bonded to the first face of the first panel.

Advantageously, the manufacturing method involves, after the perforation step, a blocking step during which a second plate is fastened to the second face of the second panel.

The invention also proposes a soundproofing assembly having a first panel of honeycomb structure, each cell of the first panel opening both at a first face of the first panel and at a second face of the first panel, an intermediate plate bonded to the second face of the first panel so as to close off one end of each cell of the first panel, a layer of adhesive deposited on the intermediate plate on the side opposite the first panel, a second panel of honeycomb structure, each cell of the second panel opening both at a first face of the second panel and at a second face of the second panel, wherein the first face of the second panel is bonded to the layer of adhesive, and wherein the intermediate plate and the layer of adhesive are perforated at the bonding zone of the second panel, wherein the soundproofing assembly is obtained via a manufacturing method according to one of the preceding variants.

The invention also proposes a propulsion assembly having a nacelle with a duct and a soundproofing assembly according to the preceding variant disposed around the duct.

The invention also proposes an aircraft having at least one propulsion assembly according to the preceding variant.

BRIEF DESCRIPTION OF THE DRAWINGS

The abovementioned features of the invention, along with others, will become more clearly apparent upon reading the following description of an exemplary embodiment, the description being given with reference to the appended drawings, in which.

DETAILED DESCRIPTION OF THE PREFERRED EMBODIMENTS

Figure 1:
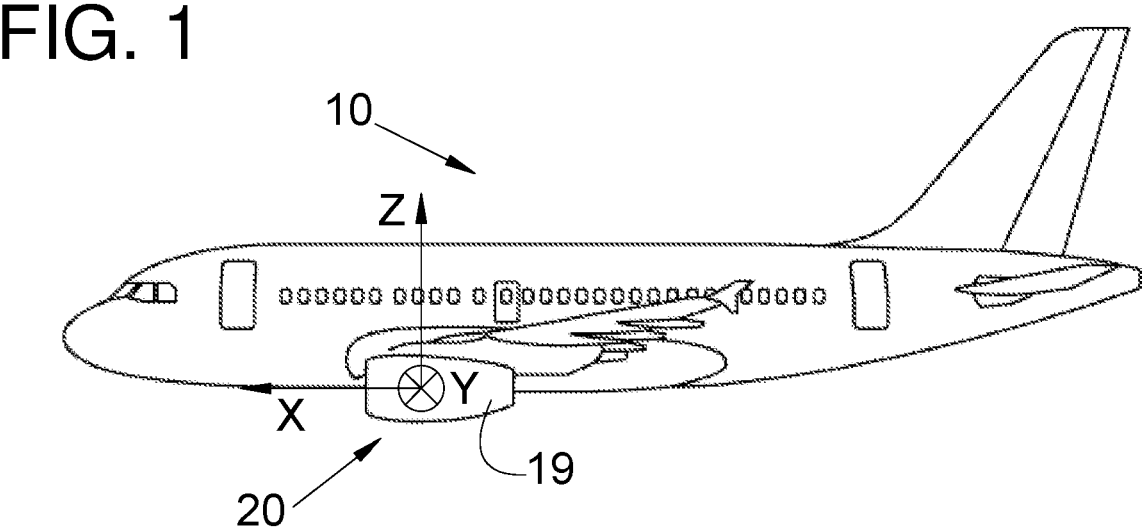
FIG. 1 shows a side view of an aircraft according to the invention.

In the following description, terms relating to a position are considered in relation to an aircraft in a position of forward movement, i.e., as shown in FIG. 1.

FIG. 1 shows an aircraft 10 that has a propulsion assembly such as a turboshaft engine 20.

Throughout the following description, by convention, the X direction corresponds to the longitudinal direction of the turboshaft engine 20, this direction being parallel to the longitudinal axis X of the turboshaft engine 20. Moreover, the Y direction corresponds to the direction oriented transversely with respect to the turboshaft engine 20, and the Z direction corresponds to the vertical direction or height, these three directions X, Y, Z being mutually orthogonal.

Figure 2:
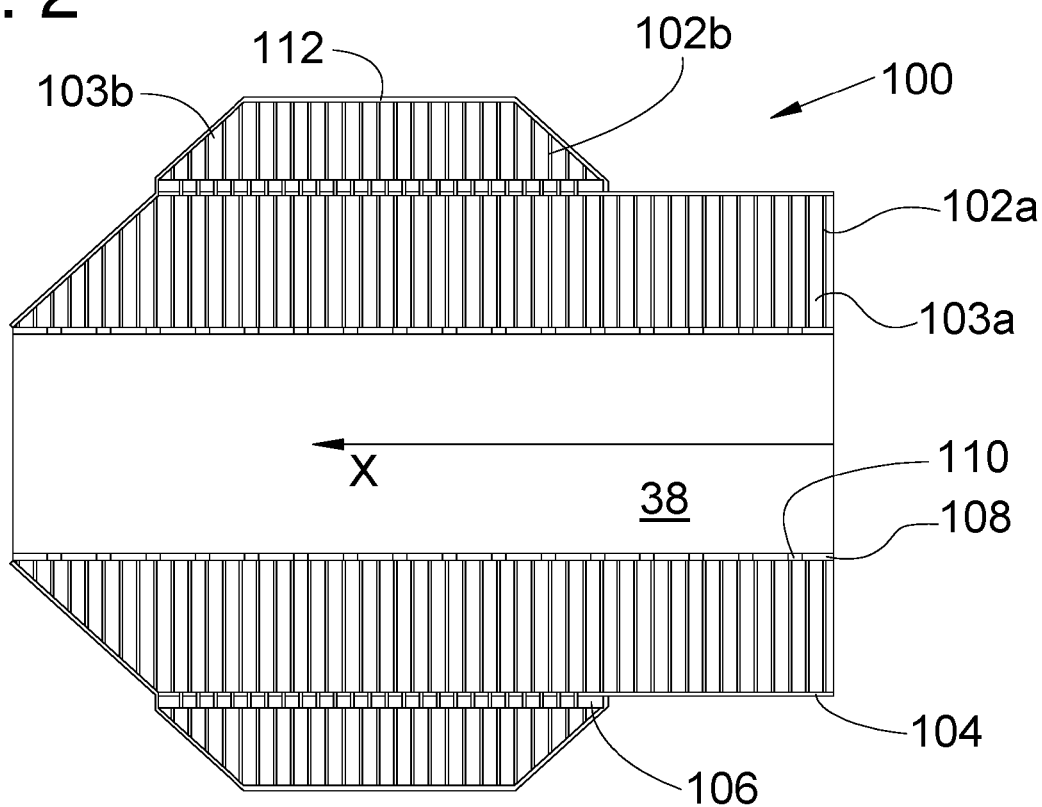
FIG. 2 is a side view in cross section of an assembly according to the invention that is intended to be put in place in a nacelle of a turboshaft engine according to the invention.

The turboshaft engine 20 conventionally has a nacelle 19 in which is housed a soundproofing assembly 100 (FIG. 2).

FIG. 2 shows a cross section of the soundproofing assembly 100 that makes acoustic treatment possible. The soundproofing assembly 100 is disposed around a duct 38 that channels the air towards a motor that has, for example, inter alia, a fan.

The soundproofing assembly 100 has a first panel 102a, which is, in this case, an inner panel, and a second panel 102b, which is, in this case, an outer panel, wherein the first panel 102a is around the duct 38 and the second panel 102b is around the first panel 102a.

Each panel 102a-b is made up of a honeycomb structure made up of cells 103a-b that adjoin one another. In the embodiment of the invention that is presented here, all the cells 103a-b are mutually parallel, and in this case extend radially with respect to the longitudinal direction X.

Each panel 102a-b can be made up of a plurality of sub-panels disposed contiguously next to one another so as to form a torus around the duct 38, each panel 102a-b and sub-panel then having a curved shape.

Of course, even though the invention is described in the case of curved panels 102a-b, it applies equally for flat panels. In the same way, each panel 102a-b has triangular fronts, but the invention applies equally for panels with straight fronts.

The soundproofing assembly 100 is fastened to a structure of the nacelle 19.

Figure 3:
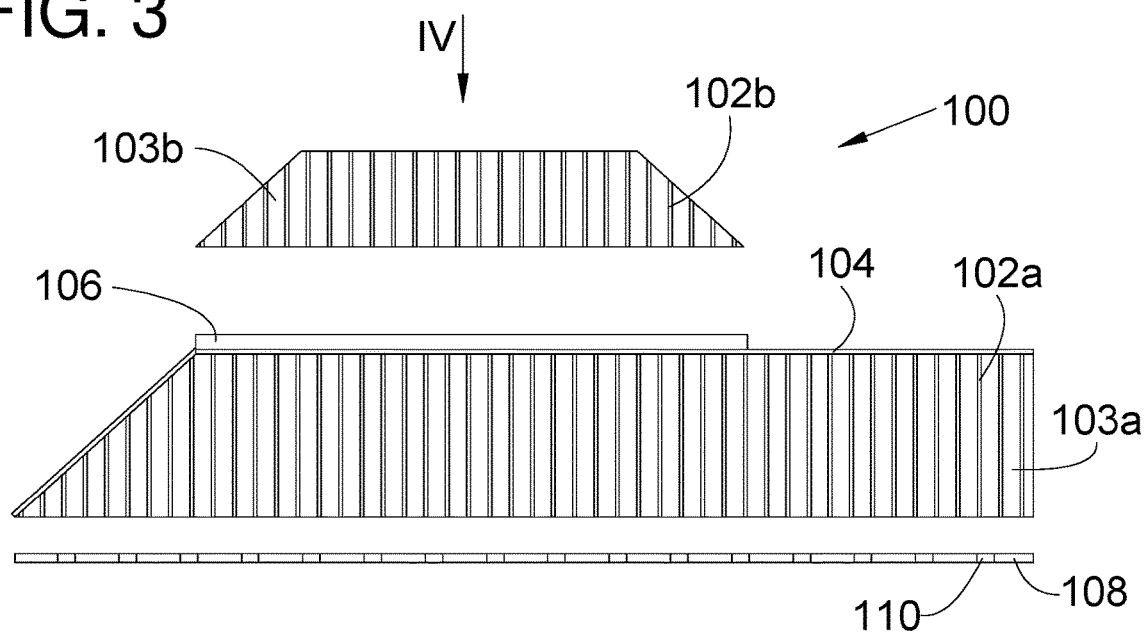
FIG. 3 is a partially exploded view in cross section of a soundproofing assembly according to the invention.

FIG. 3 shows a partially exploded view of the soundproofing assembly 100 that is intended to illuminate the method for manufacturing the assembly 100.

The general principle of the method for manufacturing the assembly 100 comprises:

a first provision step during which a first panel 102a of honeycomb structure is provided, each cell 103a of the first panel 102a opening both at a first face of the first panel 102a and at a second face of the first panel 102a, a fastening step during which an intermediate plate 104 is fastened, for example by bonding, against the second face of the first panel 102a so as to close off one end of each cell 103a of the first panel 102a, the intermediate plate 104 being solid and therefore not perforated, an adhesive-coating step during which a layer of adhesive 106 is deposited on the intermediate plate 104 on the side opposite the first panel 102a, a second provision step during which a second panel 102b of honeycomb structure is provided, each cell 103b of the second panel 102b opening both at a first face of the second panel 102b and at a second face of the second panel 102b, a bonding step during which the first face of the second panel 102b is bonded to the layer of adhesive 106, and a perforation step during which the intermediate plate 104 and the layer of adhesive 106 are perforated through the cells 103a of the first panel 102a or the cells 103b of the second panel 102b.

The piercings 105 realized during the perforation step are realized at the bonding zone of the second panel 102b, i.e., the zone common to the two panels 102a-b. Depending on the geometries of the two panels 102a-b, the perforation can be effected through one and/or the other of the panels 102a-b.

Figure 4:
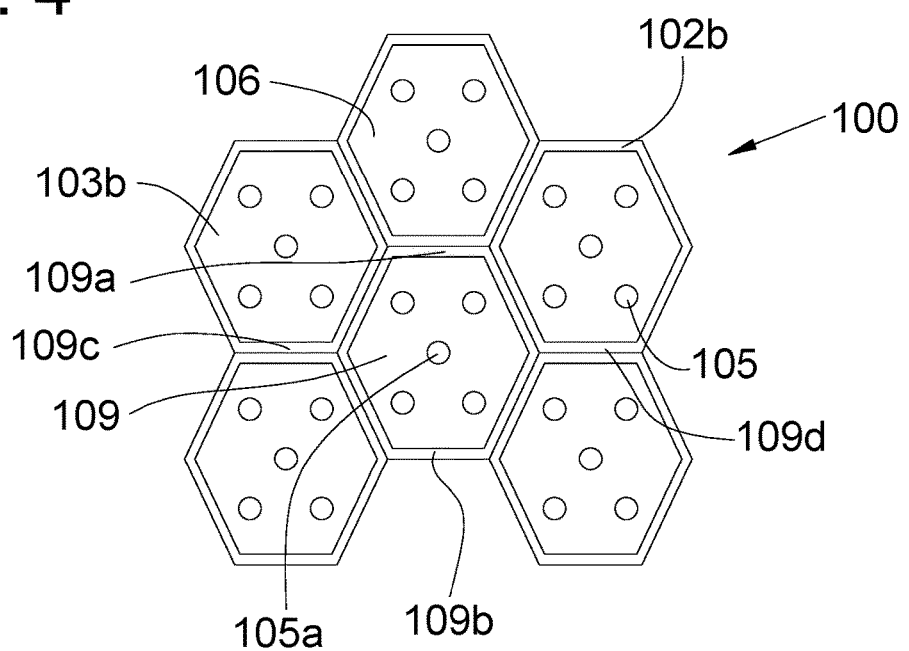
FIG. 4 is a view along the arrow IV in FIG. 3.

FIG. 4 shows a view along the arrow IV in FIG. 3 wherein the piercings 105 realized in the intermediate plate 104 and the layer of adhesive 106 are visible from the second face of the second panel 102b.

Each cell 103a-b is hollow and hexagonal in shape, but other shapes are conceivable. Each cell 103a-b is delimited by edges.

The cells 103a-b are joined by nodal joints perpendicular to the direction of expansion of the honeycomb structure. For example, in FIG. 4, the nodal joints are the two horizontal walls of a cell 103a-b when the direction of expansion of the cell 103a-b is vertical.

With such a method, the dust that may be generated during the piercing is no longer an obstacle to the bonding of the two panels to one another and furthermore, the holes are no longer closed off by the second panel. It is therefore no longer necessary to provide additional piercing or cleaning steps, hence time is saved.

Each piercing 105 may preferentially be realized by a laser beam, but it is also possible to use mechanical piercing with, by way of example, a drill bit or a milling cutter.

According to the invention, the piercing is effected automatically. To this end, the method is implemented with an imaging unit, of the scanner type, which images the openings of the cells 103a-b and is controlled by a control unit that receives an image from the imaging unit. The imaging unit thus captures an image of an opening of a cell 103a-b and transmits this image to the control unit that analyses it and identifies the edges of the cell 103a-b in question. On the basis of this identification, the control unit determines positions for the piercings 105 inside these edges and controls a piercing unit so that it is positioned successively facing each of the determined positions for the piercings and effects the piercings 105.

Thus, the piercing is done quickly and automatically, and always inside the cell 103a-b.

According to a particular embodiment, the imaging unit captures an image of a plurality of openings of neighboring cells 103a-b and transmits this image to the control unit that analyses it. For one cell (in this case the cell 109), the control unit identifies two nodal joints of the cell 109, i.e., in this case the horizontal parallel walls 109a-b, and two nodal joints that have the same orientation as the nodal joints of the cell 109 (in this case horizontal) and are disposed on either side of the cell 109, i.e., in this case the nodal joints 109c-d of the neighboring cells 103a-b in the horizontal direction.

On the basis of this identification, the control unit determines the central position of the cell 109, so as to pierce a central piercing 105a there, and controls the piercing unit so that it is positioned facing the determined central position and effects the piercing 105a.

The central position corresponds to the position that is equidistant from the two nodal joints 109a-b of the cell 109, i.e., on a midline between the two nodal joints 109a-b and parallel to the two nodal joints 109a-b, and equidistant from the two nodal joints 109c-d of the neighboring cells 103a-b, i.e., on a line that constitutes an axis of symmetry for the two nodal joints 109c-d.

The analysis of the images received and the determination of the piercing points are carried out by any appropriate image processing software.

The control unit is for example of the type comprising, connected by a communication bus: a processor or CPU ("Central Processing Unit"); a RAM ("Random Access Memory"); a ROM ("Read Only Memory"); a storage unit such as a hard disk or a storage medium reader, such as an SD ("Secure Digital") card reader; at least one communication interface allowing for example the processing unit to communicate with the imaging unit and the piercing unit.

The processor is capable of executing instructions loaded into the RAM from the ROM, from an external memory (not shown), from a storage medium (such as an SD card), or from a communication network. When the item of equipment is turned on, the processor is capable of reading instructions from the RAM and executing them. These instructions form a computer program that causes the implementation, by the processor, of all or some of the algorithms and steps described here.

All or some of the algorithms and steps described below may be implemented in software form by executing a set of instructions using a programmable machine, for example a DSP ("Digital Signal Processor") or a microcontroller, or be implemented in hardware form by a machine or a dedicated component, for example an FPGA ("Field-Programmable Gate Array") or an ASIC ("Application-Specific Integrated Circuit").

The piercing unit is for example a laser, a drill employing a drill bit, etc.

In the case in which the material making up the intermediate plate 104 and the layer of adhesive 106 have to be subjected to heat in order to undergo crosslinking, the manufacturing method involves, between the bonding step and the perforation step, a curing step. This is for example the case when composite materials are used. In this case, a caul plate can be positioned on the face opposite the bonded face of the panel 102a-b so as to limit the effect of deformation of the cells during the curing step, known as "telegraphing".

In order to complete the assembly 100, the manufacturing method involves a placement step during which a first plate 108, called resistive plate, which is porous to sound waves is bonded to the first face of the first panel 102a. This placement step can be implemented after the first provision step and practically at any stage of the manufacturing method and before the curing step if the first plate 108 has to undergo the curing step.

The porosity of the first plate 108 is realized, for example, by holes 110 through the first plate 108 or by a porous fabric or a lattice.

In order to complete the assembly 100, a second plate 112 is fastened to the second panel 102b on the side opposite the intermediate plate 104 and closes off the cells 103b of the second panel 102b at the second face of the second panel 102b.

The manufacturing method thus involves, after the perforation step, a blocking step during which the second plate 112 is fastened to the second face of the second panel 102b.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a soundproofing assembly, said manufacturing method comprising:
    a first provision step comprising providing a first panel of honeycomb structure comprising a plurality of cells, each cell of the first panel opening both at a first face of the first panel and at a second face of the first panel, wherein the plurality of cells are joined along nodal joints,
    a fastening step comprising fastening an intermediate plate against the second face of the first panel to close off one end of each cell of the plurality of cells of the first panel, wherein an opposing end of each cell of the plurality of cells of the first panel remains open and uncovered,
    an adhesive-coating step comprising depositing a layer of adhesive on the intermediate plate on the side opposite the first panel,
    a second provision step comprising providing a second panel of honeycomb structure comprising a plurality of cells, each cell of the second panel opening both at a first face of the second panel and at a second face of the second panel, wherein the plurality of cells are joined along nodal joints,
    a bonding step comprising bonding the first face of the second panel to the layer of adhesive to close off one end of each cell of the plurality of cells of the second panel, wherein an opposing end of each cell of the plurality of cells of the second panel remains open and uncovered, and
    a piercing step comprising piercing the intermediate plate and the layer of adhesive through the open and uncovered cells of the first panel or the open and uncovered cells of the second panel at a bonding zone of the second panel,
    wherein an imaging unit captures an image of an open and uncovered opposing end of a cell and transmits this image to a control unit that analyses the image and identifies edges of said cell,
    wherein the control unit determines positions for piercings inside these edges and controls a piercing unit so that the piercing unit is positioned successively facing each of the determined positions for the piercings and effects the piercings.

2. The manufacturing method according to claim 1, wherein the imaging unit captures an image of open and uncovered opposing ends of neighboring cells and transmits this image to the control unit that analyses the image and identifies two nodal joints of said cell and two nodal joints of the neighboring cells that have the same orientation as the nodal joints of said cell and are disposed on either side of said cell,
    wherein the control unit determines a central position of the cell and controls the piercing unit so that the piercing unit is positioned facing said determined central position and effects a piercing.

3. The manufacturing method according to claim 2, wherein the central position corresponds to a position that is equidistant from the two nodal joints of said cell and equidistant from the two nodal joints of the neighboring cells.

4. The manufacturing method according to claim 1, wherein the method involves, between the bonding step and the piercing step, a curing step.

5. The manufacturing method according to claim 1, wherein the method involves a placement step comprising bonding a first plate that is porous to sound waves to the first face of the first panel.

6. The manufacturing method according to claim 1, wherein the method includes, after the piercing step, a blocking step during which a second plate is fastened to the second face of the second panel.

7. The manufacturing method according to claim 1, wherein the second panel comprises a second plurality of cells, wherein the intermediate plate closes off one end of each cell of the second plurality of cells of the second panel, wherein an opposing end of each cell of the second plurality of cells remains open and uncovered, and wherein the one end of each cell of the second plurality of cells of the second panel remains closed subsequent to the piercing step.

* * * * *